United States Patent [19]

Tashiro et al.

[11] Patent Number: 4,919,587
[45] Date of Patent: Apr. 24, 1990

[54] APPARATUS FOR SEPARATING AND TRANSFERRING SOFT CUPS

[75] Inventors: Yasunori Tashiro; Yuji Suzuki, both of Tochigi, Japan

[73] Assignee: Rheon Automatic Machinery Co., Ltd., Utsunomiya, Japan

[21] Appl. No.: 267,068

[22] Filed: Nov. 4, 1988

[30] Foreign Application Priority Data

Nov. 7, 1987 [JP] Japan .................................. 62-281648

[51] Int. Cl.$^5$ ............................................. B65G 59/10
[52] U.S. Cl. ................................ 414/795.8; 221/209;
414/795.6; 414/796.1; 414/797
[58] Field of Search ............................... 221/186, 209;
414/795.6, 795.8, 796.1, 796.9, 797, 798.1

[56] References Cited

U.S. PATENT DOCUMENTS 2,976,659  3/1961  Flanagan et al. ............ 414/795.6 X
3,104,018  9/1963  Booth ........................... 414/796.9 X

FOREIGN PATENT DOCUMENTS 875810  8/1961  United Kingdom ................ 414/797

Primary Examiner—Frank E. Werner
Assistant Examiner—Janice Krizek
Attorney, Agent, or Firm—Guy W. Shoup; Paul J. Winters

[57] ABSTRACT

An apparatus for separating a stack of cups made of soft material one from each other and transferring them is provided. This apparatus includes a continuously rotating cup holder and a suction nozzle that is mounted on a vertically and horizontally movable arm. The suction nozzle sucks the top cup in a stack of cups that are in the cup holder while the other cups are rotated as the cup holder rotates. The top cup is separated from the other cups and transferred to a preselected position by the suction nozzle.

8 Claims, 7 Drawing Sheets

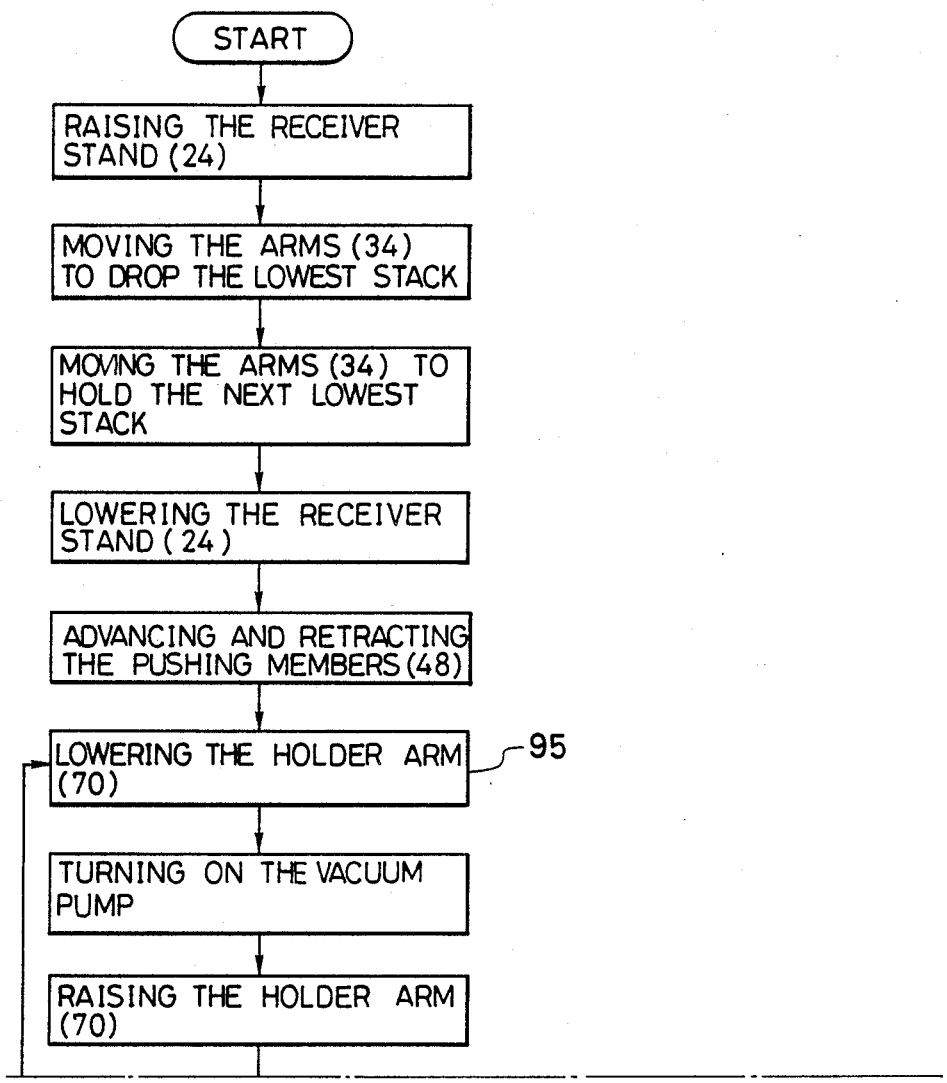

APPARATUS FOR SEPARATING AND TRANSFERRING SOFT CUPS

FIELD OF THE INVENTION

This invention relates to an apparatus for separating cups one by one from a stack of cups and transferring each cup onto a conveyor device. These cups are made of soft material such as paper or aluminiun foil, and are used for holding the dough of sponge cakes, madeleine cakes, etc., while they are baked.

PRIOR ART

A cup used for holding the dough of sponge cakes or madeleine cakes is generally made of thin paper, such as glassine, or aluminium foil. Conventionally, 40 to 60 such cups are prepared simultaneously by stamping flat forms for the cups out of stacked sheets of paper, and then shaping the flat forms into three-dimensional forms. As shown in FIG. 2, such cups usually have pleats on their sides. Further, when the flat forms are stamped out, their edges tend to have small notches. Since such notches and side pleats of a cup tend to stick to those of another, the cups in a stack which are prepared in one stamping process stick to each other. Thus it is difficult to remove one cup from a stack and to supply them to a conveyor one by one automatically.

Japanese Laid-open Patent Publication No. 60-204523 discloses an apparatus for supplying paper cups. It is shown in FIG. 6. This apparatus includes a paper cup holder (101) containing a stack of paper cups (102), a suction nozzle (103) that is connected to the lowest end of a shaft (105), and a conveyor device (107) that conveys baking pans (109). The shaft (105) is connected to a driving cylinder (111) via an arm (113) for axially rotating the shaft (105). The shaft (105) is also connected to the rod of an air cylinder (115) mounted on a side frame. The air cylinder (115) raises and lowers the shaft (105).

In operation the shaft (105) is lowered so that the suction nozzle (103) is pressed against the top cup in the stack of paper cups (102). Then suction is provided through the suction nozzle (103) from a vacuum pump (not shown) so that the top cup is sucked to the suction nozzle (103). In turn, the driving cylinder (111) is turned on to axially rotate the shaft (105) at a predetermined angle, and then it is turned off. Thus the top cup drawn to the suction nozzle rotates while the other cups held in the paper cup holder (101) remain in the same position. Since the top cup is rotated in relation to the lower cups, the notches and pleats of the cups become disengaged and the top cup is separated from the other cups. Then the shaft (105) is raised and horizontally moved so that the cup attached to the suction nozzle (103) is positioned directly above the hollow on each cooking plate (109) conveyed by the conveyor device (107). Finally, the nozzle (103) is lowered and the suction is removed so that the cup drops onto the hollow provided on the cooking plate (109).

Japanese Laid-open Patent Publication No. 60-248521 and Japanese Laid-open Utility Model Publication No. 61-175108, which were both filed by the applicant of the prior art publication discussed above, disclose apparatuses for supplying paper cups. They are similar to the apparatus disclosed in the above publication.

In these apparatuses, an operator should stop the transferring operation when he supplies additional stacks of paper cups to the paper cup holder (101). Further, since the driving cylinder periodically turns on and off during the operation, it is subjected to an overload and becomes worn out.

SUMMARY OF THE INVENTION

The object of this invention is to provide an apparatus for separating paper or aluminium foil cups one by one from a stack of such cups and transferring them more efficiently than do the prior art apparatuses.

This invention provides an apparatus for separating from each other a stack of cups made of soft material such as paper or aluminum foil and then transferring them, and the apparatus comprises a continuously rotating holder means on which a stack of said cups is placed, and a vertically and horizontally movable non-rotating suction means arranged to be lowered and pressed against the cup at the top of said stack on said rotating holder, suck a cup out of and separate said cup from said stack of cups and, after being raised, to be horizontally moved to transfer said cup to a preselected position.

BRIEF EXPLANATION OF THE DRAWINGS

FIGS. 7, 7a and 7b show a flow chart of the operation performed by the apparatus of the third embodiment of this invention.

EMBODIMENTS

Figure 1:
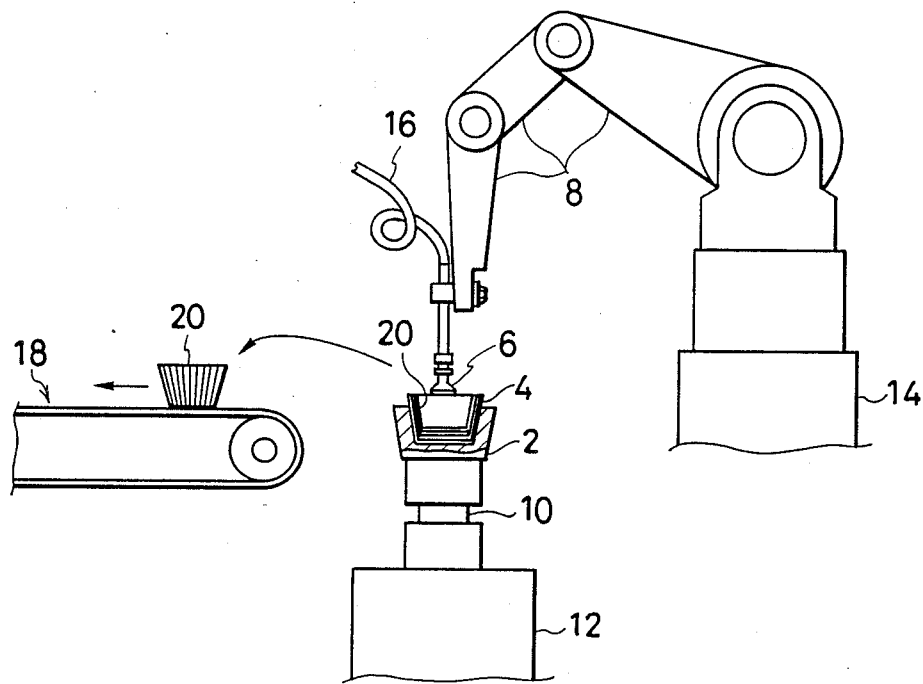
FIG. 1 shows a schematic side view of an apparatus of a first embodiment of this invention.

In FIG. 1, the first embodiment of the apparatus of this invention for separating a stack of cups made of soft material from each other and transferring them comprises a cup holder (2), a suction nozzle (6), and a vertically and horizontally movable arm (8).

The cup holder (2) has a hollow portion for holding a stack (4) of paper cups. Each stack may contain about 50 cups. The cup holder (2) is mounted on a continuously rotating shaft (10) which is operatively connected to a first drive means (12) such as a motor or air cylinder system.

The vertically and horizontally movable arm (8) comprises three members connected by joints. On the forward end of the arm (8) a tube (16) with a suction nozzle (6) at its lower end is mounted. The arm (8) has a conventional robot structure and is connected to a second drive means (14) so that the suction nozzle (6) can be raised and lowered and horizontally moved.

The tube (16) is connected at its other end to a vacuum pump (not shown). The nozzle (6) comprises a hollow and downwardly expanding rubber piece. Adjacent the cup holder (2) a conveyor device (18) is provided for receiving and transferring cups (20) separated from the remaining cups in the stack of paper cups (4).

The cups (20) are transferred by the suction nozzle (6) and the arm (8).

In operation, the suction nozzle (6) is first positioned above the cup holder (2) so that the rubber piece of the suction nozzle (6) can move toward the stack of paper cups (4) in the paper cup holder (2) as shown in FIG. 1. Then the suction nozzle (6) is lowered until the rubber piece is pressed against the inside bottom of the hollow of the cup at the top (20) of the stack (4). Then the pump is activated and suction is provided through the nozzle. Thus the top cup (20) is sucked to the rubber piece. That is, the top cup (20) sucked to the rubber piece is held in position while the other cups in the stack of paper cups (4) are kept rotating. Therefore, the top cup (20), which would otherwise be unseparable from the lower cups due to it being stuck with them at its edge, becomes disengaged and separated from the lower cups in the stack of paper cups (4).

In turn, the arm (8) raises the suction nozzle (6) and the cup (20). The joints move arm members to extend the arm (8). Thus the cup (20) is horizontally transferred until it is positioned on the conveyance belt of the conveyor device (18). Then the vacuum pump is turned off and suction is removed from the suction nozzle (6). Thus the cup (20) is released from the suction nozzle (6) and drops on a preselected area of the conveyor device (18) as shown in FIG. 1.

Figure 2:
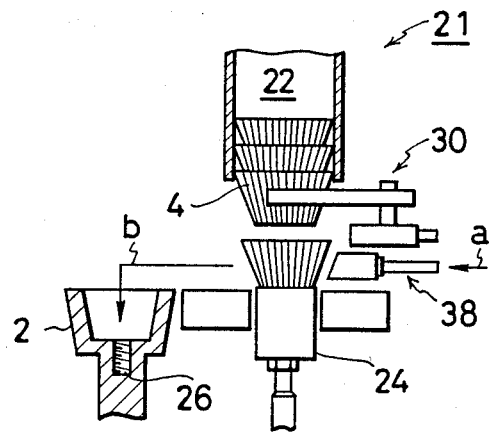
FIG. 2 shows a mechanism for stocking cups and for supplying a stack of cups, in a second embodiment of this invention.

In a second embodiment the apparatus includes a mechanism (21) for stocking up stacks of paper cups and supplying them to the cup holder (2). In FIG. 2, an example of the stocking and supplying mechanism (21) is shown. The mechanism (21) includes a stock chamber (22) that contains stacks of paper cups (4) and a receiver stand (24) that is positioned directly beneath the exit port of the stock chamber (22). As shown in FIG. 2, the receiver stand (24) is positioned adjacent the cup holder (2).

In this second embodiment, a sensor (26) is mounted on the cup holder (2). This sensor (26) is a conventional reflective sensor that detects the presence or absence of the stack of paper cups in the hollow of the cup holder (2) and then generates a signal to indicate the detected results. The stocking and supplying mechanism (21) also includes a pusher mechanism (38). The shaft of the pusher mechanism (38) is connected to a third drive means (not shown), for example, an air cylinder system. Adjacent the exit port of the stock chamber (22) a stopper mechanism (30) is provided. The stopper mechanism (30) comprises a pair of arms that hold the lower portion of the lowest stack of paper cups to prevent the stacks from dropping. The arms are operatively connected to a fourth drive means (not shown) so that the forward ends of the arms pivotally move away from each other. The construction of the pusher mechanism (38) and the stopper mechanism (30) will be discussed in detail below.

In operation, the arms of the stopper mechanism (30) move away from each other so that the space through which a stack of paper cups (4) can pass is provided between them when the fourth drive means of the stopper mechanism (30) receives a signal indicating the absence of the stack of paper cups. Thus the lowest stack of paper cups (4) drops onto the receiver stand (24). As soon as the stack (4) is released from the exit port of the stock chamber, the arms of the stopper mechanism (30) return to their original positions. Thus the stacks above the dropped stack (the next lowest stack) are held by the stopper mechanism (30) as shown in FIG. 2. Then, the third drive means of the pusher mechanism (38) is activated so that it moves forwardly as indicated by the arrow a in FIG. 2. Thus the pusher mechanism (38) pushes the stack of paper cups (4) toward the hollow of the cup holder (2) until the stack of paper cups (4) drops into the hollow of the cup holder (2) as shown by the arrow b in FIG. 2.

The apparatus of this invention may include a conventional sequence controller. The actuator of the vacuum pump, the actuators of the drive means for the vertically and horizontally movable arm (8), the pair of arms of the stopper mechanism (30), and the pusher mechanism (38), all communicate with the sequential controller so that the operations of these elements can be readily controlled and adjusted. For example, the distance over which the cup (20) is transferred from the cup holder (2) to the conveyor device (18) can be adjusted by programming a desired sequence into the sequence controller. That is, the sequence controller sends signals to the step motors in the joints of the movable arms (8) so that the raising and lowering of the suction nozzle (6) and the extension of the arm (8) can be controlled. The sequence controller also sends signals to the second drive means (14) so that the rotation angle of the stand on which the movable arm (8) is mounted can be controlled. Therefore, the vertical and horizontal movements of the arm (8) can be easily adjusted by reprogramming the sequence controller.

Now, by reference to FIGS. 3, 4 and 5, a third embodiment of this invention will be explained. This arrangement includes three cup holders (2) and three receiver stands (24) mounted on a frame (36), a pusher mechanism (38) located right behind the receiver stands (24), a mechanism (40) for vertically and horizontally moving suction nozzles (6) located above the cup holders (2), a stocking and supplying mechanism (21), and a conveyor device (18).

By reference to FIGS. 3 and 4, the stocking and supplying mechanism (21) will now be explained in detail. The mechanism (21) comprises three stock chambers (22) and three stopper mechanisms (30), which all are mounted on a plate (31) extending from a side frame (78). The plate (31) has three holes large enough to pass the stack of paper cups (4). Surrounding each hole are six column pins (32). The pins (32) are mounted on the plate (31) to form a stack chamber (22). A plurality of stacks of paper cups (4) are inserted in the stock chamber (22) and held in position by the stopper mechanism (30), as will be discussed below.

Each of the stopper mechanisms (30) includes an actuator (33) mounted on the plate (31) and a pair of arms (34). The arms (34) are fixed to the pins extending from the actuator (33) as shown in FIG. 3. The actuator (33) is a conventional pneumatic drive means and is connected to a compressor device (not shown). Thus, when the actuator (33) is activated, the pins rotate so that the arms (34) are pivotally moved away from or toward each other as indicated by arrows g in FIG. 4. As shown in FIG. 4, the arms (34) include inwardly extended portions on their forward ends. The extended portions extend inwardly between the column pins (32). On the inner surfaces of the extended portions are provided concave surfaces to fit around the lower portion of the stack of paper cups (4). Thus, when the arms (34) are at their original positions as shown in FIG. 4, they firmly hold the lowest stack of paper cups in the stock chamber (22) in position. However, when the actuator (33) is activated so that the arms (34) are moved away from each other, the lowest stack of paper cups is released. Thus they drop through the respective holes of the plate (31). Directly beneath the respective holes on the plate (31), receiver stands (24) are mounted on the frame (36) so that their upper surfaces are at the same level as the top surface of the frame. Under the frame (36), three air cylinders (46) are mounted. They will be called herein the first air cylinders. As shown in FIG. 3, each of the receiver stands (24) is mounted on the shaft of each of the first air cylinders (46) so that the receiver stand (24) is raised or lowered as indicated by an arrow d.

Figure 4:
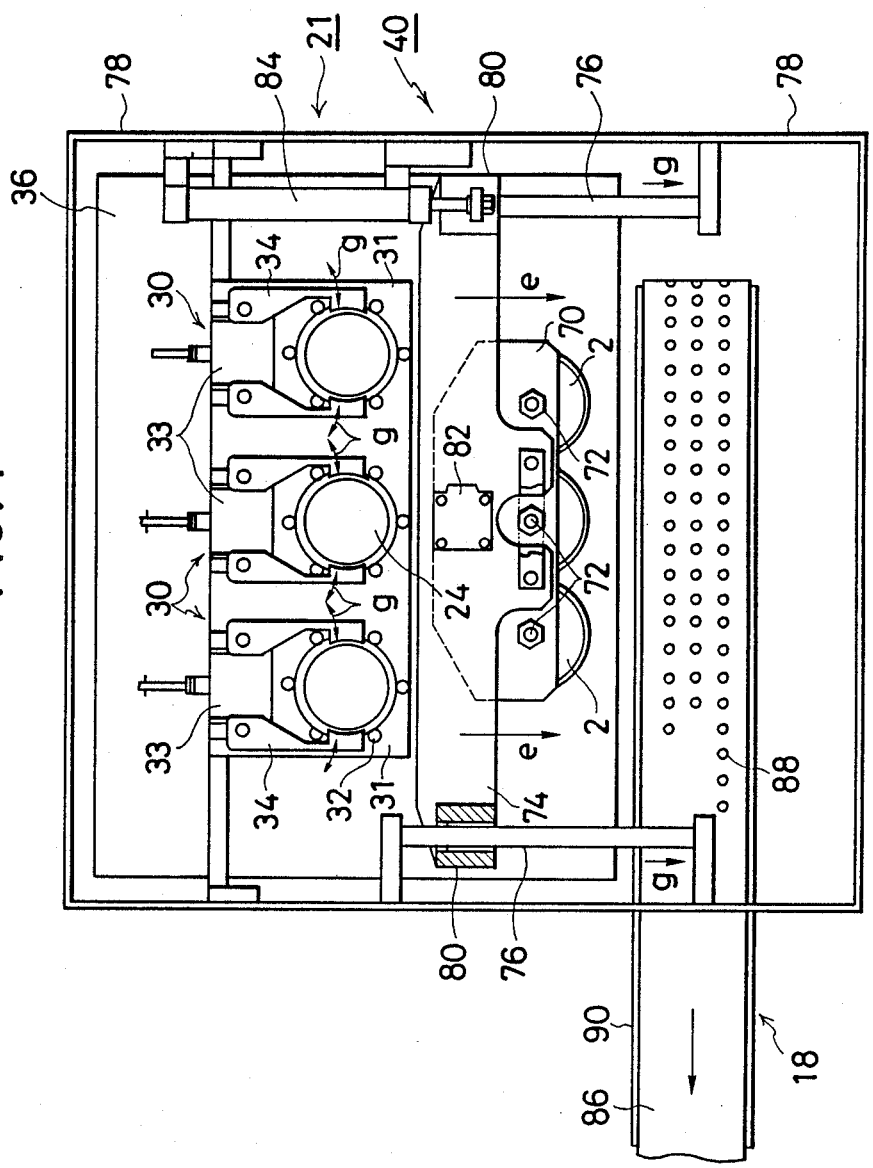
FIG. 4 shows a top plan view of the stopper mechanism and the mechanism for vertically and horizontally moving the suction nozzle in the apparatus of FIG. 3.
Figure 5:
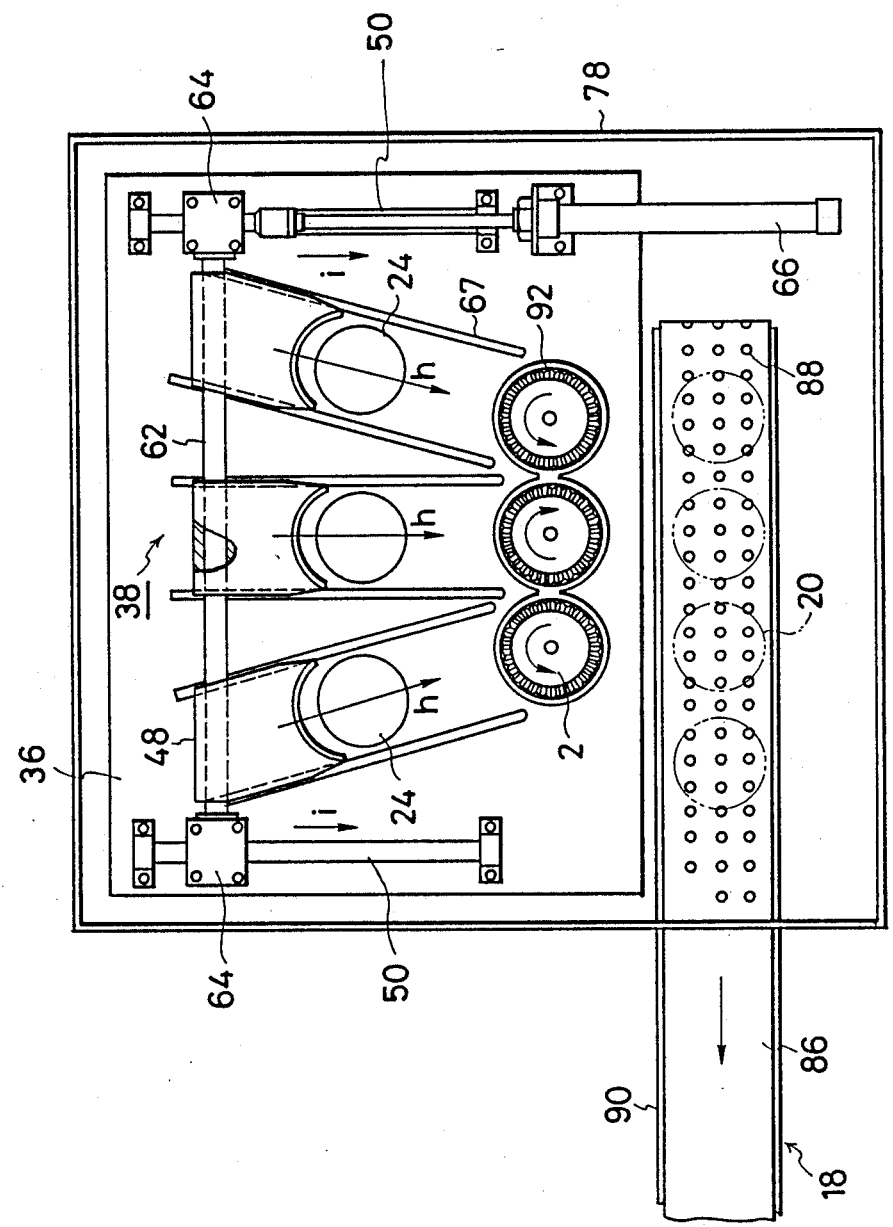
FIG. 5 shows a top plan view of the pusher mechanism and cup holders mounted on the frame of FIG. 3.
Figure 6:
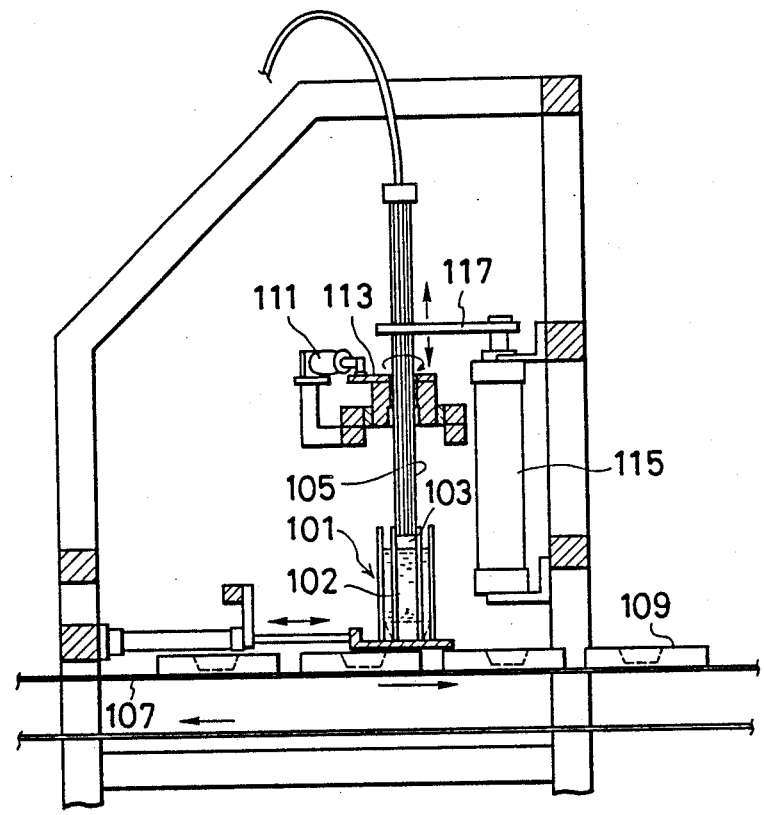
FIG. 6 shows a side view of a prior art apparatus.

In FIG. 5, the pusher mechanism (38) is shown in detail. The pusher mechanism (38) includes three pushing members (48), a pair of parallel rods (50), and a cross shaft (62). To clearly show this pusher mechanism (38), the mechanism (40) for vertically and horizontally moving the suction nozzle, and the stocking and supplying mechanism (21) in FIG. 4, are not included in FIG. 5.

The first parallel rods (50) are mounted on the frame (36). The cross shaft (62) is connected to the first parallel rods (50) by the slider guides (64). One of the slider guides is connected to a second air cylinder (66) so that the cross shaft (62) can slidably move back and forth along the rods (50) as described by arrows i in FIG. 5.

Figure 3:
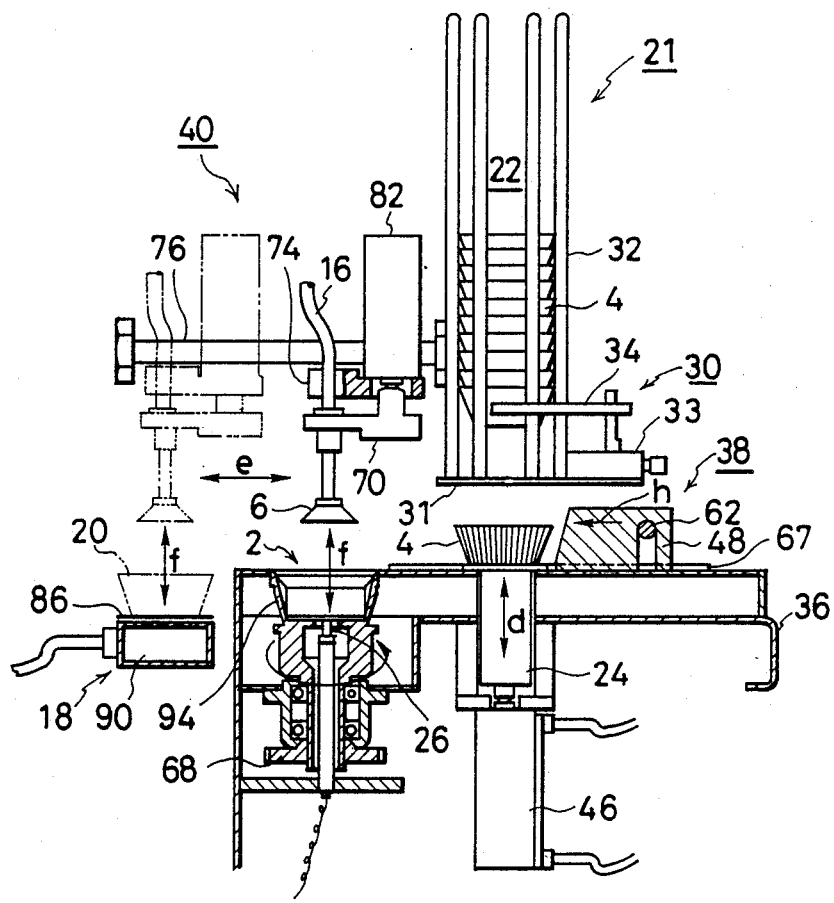
FIG. 3 shows a side view of an apparatus of a third embodiment of this invention.

As shown in FIGS. 3 and 5, the cross shaft (62) extends through the recesses which are provided on the bottom of each of the pushing members (48). Each of these pushing members (48) has a concave surface, in horizontal cross-section, on its forward end so that it fits the outer surface of each stack of paper cups (4). The pushing members (48) are positioned so that their forward ends face toward the respective cup holders (2).

A pair of track rails (67) for each pushing member (48) are provided on the frame (36). Steps that are complementary to the track rails (67) are provided on both sides on the bottom edges of each pushing (48). Since the steps engage the track rails (67), the movements of the pushing members (48) are defined by them. That is, in this embodiment, as the cross shaft (62) is pulled forwardly by the second air cylinder (66) and thus the pushing members (48) advance, the pushing members (48) become closer and gather at their center, while they trace the track rails (67) as indicated by arrows h. These track rails (67) are constructed so that they can guide the pushing members (48) to reach the positions right behind the respective cup holders (2).

The cup holders (2) are mounted on the frame (36). Each of the cup holders (2) includes a receiver portion (94) with a hollow in which the stack of paper cups are placed. The side wall (92) of the hollow is shaped so that it is complementary to that of the pleats of a paper cup. When the stack of paper cups are placed in the hollow, the wall (92) fits the pleats of the paper cup, and prevent the paper cups from slipping and rotating in the hollow.

The receiver portion (94) is mounted on a gear mechanism (68) which is operatively connected to a drive means (not shown), for example, an air cylinder system or a motor so that the receiver portion of each cup holder rotates continuously in one direction. In this embodiment, the middle cup holder rotates in the opposite direction to that of the other cup holders because of the gear arrangements as shown in FIG. 5. On the bottom of the receiver portion, a sensor (26) to detect the presence or absence of a stack of paper cups (4) is provided.

The suction nozzle (6) and the mechanism (40) for vertically and horizontally moving the suction nozzle will now be explained in detail by reference to FIGS. 3 and 4. The suction nozzle (6) of this embodiment has a structure similar to the suction nozzle in FIG. 1. However, to simplify the description, the suction nozzle (6) is not included in FIG. 4. The mechanism (40) for vertically and horizontally moving the suction nozzle comprises a holder arm (70) that has three holes (72) through which the tubes (16) of the suction nozzles (6) are fixedly inserted, a slider plate (74), both of whose side ends are connected to a pair of second parallel rods (76) extending from the side frame (78) ia slider guides (80), and a third air cylinder (82) whose rod is connected to the holder arm (70) in the middle portion of the slider plate (74). The third air cylinder (82) raises and lowers the holder arm (70), and thus the three suction nozzles (6), in the directions as indicated by arrows f in FIG. 3. One of the slider guides (80) is connected to the rod of a fourth air cylinder (84) that extends from the side frame (78) so that the slider plate (74) slidably moves back and forth along the second parallel rods (76) in the directions as indicated by arrows e in FIGS. 3 and 4.

The conveyor device (18) of this embodiment includes a conveyance belt (86) on which a number of through holes (88) are provided, and a duct (90) box-shaped in cross-section. A vacuum is provided in the duct (90). On the top surface of the duct (90) a number of throughholes are provided (not shown). Through the holes on the duct and the belt, suction to suck and fix the paper cups on the belt is provided. Thus, even though the paper cups are light and thus can be easily moved by a slight wind, they are held in place because of the suction.

In operation, when an operator turns on the apparatus in FIG. 3 to start the process, the first air cylinders (46) are activated to raise the receiver stands (24) so that their upper surfaces are at about the level of a preselected distance spaced apart from and beneath the lowest stacks of cups (4) in the respective stock chambers (22). Then the actuators (33) are activated so that each arm of the pairs of arms (34) moves away from the other arm. A space through which a stack of paper cups can pass is provided between each pair of the arms (34). Thus all stacks of paper cups in each stock chamber (22) drop over the preselected distance until the lowest stack of paper cups is released from the arms (34) through the space and lands on the upper surface of the receiver stand in each stock chamber (22). Please note that the distance is selected so that the next lowest stack of paper cups (4) is at about the level of the arms (34) when all the stacks of paper cups (4) in any stock chamber (22) drop and are supported by the receiver stand (24). Then the actuators (33) are activated to move the arms (34) closer to each other. Thus the bottom portion of the next lowest stack of paper cups in each stock chamber (22) is held by the arms (34) in place above the receiver stand (24).

Then the first air cylinder system (46) is activated to lower the receiver stands (24) until their upper surfaces are about the same level as the top surface of the frame (36) as shown in FIG. 3. Thus the lowest stack of paper cups on each receiver stand is transferred from each stock chamber (22) through each hole of the plate (31) onto the frame (36). In turn, the second air cylinder (66) is activated to pull the cross shaft (62) forwardly along the parallel rods (50). Thus the pushing members (48)

advance as indicated by arrows h in FIG. 3 and FIG. 5 and push the respective stacks of paper cups (4) into the hollows of the respective cup holders (2). Then the second air cylinder (66) is activated to push back the cross shaft (62). Thus the pushing members (48) retract and return to their original positions as shown in FIG. 5.

As shown in FIG. 3, each of the suction nozzles (6) is held in position by the holder arm (70) above the corresponding cup holder (2) while its lowest end faces toward the hollow of the cup holder (2). As soon as the stack of paper cups (4) is supplied into the hollow of each cup holder (2), the third air cylinder (82) is activated to lower the holder arm (70) until the lowest end of each suction nozzle (6) is pressed against the inside bottom of the top paper cup of the stack of paper cups (4) in the hollow of each cup holder (2). Then the vacuum pump (not shown) is activated to provide suction through each suction nozzle (6). While the lowest end of each suction (6) is pressed against the bottom of the top paper cup, the other paper cups in the stack of paper cups (4) are continuously rotated as each cup holder (2) rotates. Thus, as is discussed above, the top paper cup of each stack is separated from the other cups and sucked to the lowest end of each suction nozzle (6) because of the suction from the vacuum pump. Then the third air cylinder (82) is activated to raise the holder arm (70) until it returns to its original position. Thus the suction nozzles (6) and the top paper cup sucked to each nozzles' lowest end are raised.

In turn, the fourth air cylinder (84) is activated to push the slider plate (74) forwardly as indicated by arrows e in FIGS. 3 and 4. Thus the suction nozzles (6) and the holder arm (70) that are connected to the slider plate (74) advance. When the suction nozzles (6) are positioned directly above the conveyance belt (86) of the conveyor device (18) the fourth air cylinder (84) is turned off to stop the slider plate (74) from advancing.

Then the third air cylinder (82) is again activated to lower the suction nozzles (6) until the bottoms of the paper cups (20) sucked to the nozzles' lowest end contact the conveyance belt (86). Then the vacuum pump is turned off so that the suction of each suction nozzle (6) can be removed. Thus the paper cups (20) are removed from the respective lowest ends of the suction nozzles (6). As a result, three cups (20) are positioned in a row on conveyance belt (86). FIG. 5 shows the position of these cups on the conveyor belt (86). Then the third air cylinder (82) is activated to raise the suction nozzles (6) and the fourth air cylinder (84) is activated to pull back the slider plate (74) until it returns to its original position that is directly above the cup holders (2).

As discussed above, the paper cups are conveyed while they are sucked to the conveyance belt because of the suction provided through the through holes (88) on the conveyance belt (86) and similar holes on the duct (90).

Figure 7B:
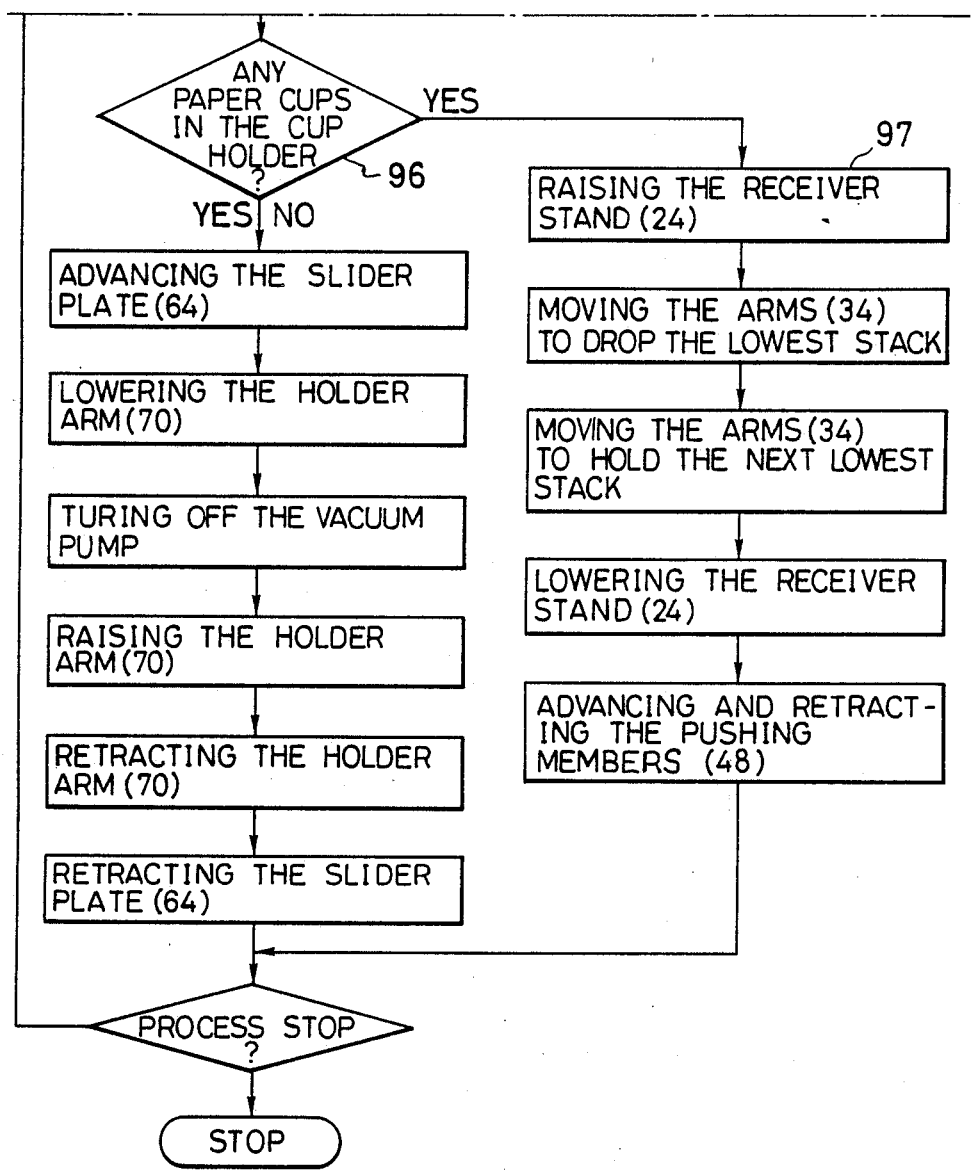

The operation discussed above is schematically described by the main routine of the flow chart in FIG. 7. When the cups (20) are transferred to the conveyor device (18), the process returns to the block (95). Thus, the operation to pick up the top paper cup of the stack in the cup holder (2) and transfer it to the conveyor device (18) is repeated until the operator turns off the apparatus to stop the process.

However, when all cups have been transferred from any one of the cup holders (2), and thus no cup is present in the cup holder (2), the process branches to a subroutine. As discussed above, the sensor (26) detects the presence or absence of the paper cups in the cup holders (2) and generates a signal indicating the presence or absence of the paper cups. Therefore, as shown in a decision block (96) of FIG. 7, as soon as the last cup in any one of the cup holders (2) is picked up and transferred, the sensor (26) detects the absence of the cup and generates a signal indicating this absence to one of the first air cylinders corresponding to the cup holder (2). Upon receipt of the absence signal, the relevant first air cylinder (46) is activated to raise the receiver stand (24) which is mounted in the frame (36) behind the cup holder (2) from which the last cup has been transferred, as shown in block 97. Then the arms (34), which are mounted above the cup holder (2), are activated to drop the lowest stack of paper cups onto the receiver stand (24). In this subroutine, the operation to supply stacks of paper cups to the respective cup holders as we discussed above is performed. Parallel to this subroutine operation, the main routine to transfer the paper cups of the preceding stacks to the conveyor device (18) proceeds. Thus, by the time the last paper cup of the preceding stacks is transferred to the conveyor device (18), the cup holders (2) are refilled with new stacks of paper cups. This subroutine occurs whenever the absence of any paper cup is detected regarding any one of the paper cup holders (2).

In this apparatus, the process from the step of supplying the stack of paper cups to the step of separating one paper cup from the other cups in each stack and transferring the paper cup to a preselected position is performed automatically and effectively, and no additional time for supplying the paper cups to the cup holder (2) is required. When the stacks of paper cups in any stock chamber (22) are reduced, the operator can supply additional stacks of paper cups into the stock chamber (22) without stopping the transferring operation of the paper cups. Further, since each of the cup holders (2) is continuously rotated in one direction, the drive means for rotating the cup holders (2) is not subjected to an overload caused by stopping and starting the rotation of the cup holders as that of the drive means in the prior art apparatuses.

We claim:

1. An apparatus for separating a stack of cups, made of soft material such as paper or aluminum foil, from each other, and transferring them comprising:
   (a) a continuously rotating holder means on which a stack of said cups is placed, and
   (b) a vertically and horizontally movable non-rotating suction means arranged to be lowered and pressed against the cup at the top of said stack on said rotating holder, suck a cup out of and separate said cup from said stack of cups and, after being raised, to be horizontally moved to transfer said cup to a preselected position.

2. The apparatus of claim 1, further comprising a sensor mounted on said rotating holder means, said sensor generating a signal to indicate the presence or absence of said stack of cups.

3. The apparatus of claim 1, further comprising an endless belt means whose conveying belt moves past said preselected position so as to receive the transferred cups.

4. The apparatus of claim 2, further comprising a chamber for containing a plurality of said stacks of cups and releasing one stack at a time, and supply means for receiving said stack and placing it on said rotating holder means in response to said signal from said sensor.

5. The apparatus of claim 1, wherein said continuously rotating holder means comprises a holder member having a hollow into which the bottom of said stack is placed and a first drive means operatively connected to said holder member for continuously rotating said holder member.

6. The apparatus of claim 5, wherein said vertically and horizontally movable non-rotating suction means comprises a suction nozzle connected to a vacuum pump, a positioning arm for positioning said suction nozzle at the top of said stack, and a second drive means operatively connected to said positioning arm for vertically and horizontally moving said positioning arm.

7. The apparatus of claim 5, wherein said first drive means comprises an air cylinder mechanism.

8. The apparatus of claim 6, wherein said second drive means comprises an air cylinder mechanism.

* * * * *